(12) United States Patent
Nishida et al.

(10) Patent No.: US 11,063,269 B2
(45) Date of Patent: Jul. 13, 2021

(54) POWER GENERATION CELL

(71) Applicant: HONDA MOTOR CO., LTD., Tokyo (JP)

(72) Inventors: Yosuke Nishida, Wako (JP); Yu Tomana, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 16/242,053

(22) Filed: Jan. 8, 2019

(65) Prior Publication Data

US 2019/0214655 A1   Jul. 11, 2019

(30) Foreign Application Priority Data

Jan. 10, 2018   (JP) .............................. JP2018-002221

(51) Int. Cl.

| | | |
|---|---|---|
| *H01M 8/026* | (2016.01) | |
| *H01M 8/0254* | (2016.01) | |
| *H01M 8/0267* | (2016.01) | |
| *H01M 8/241* | (2016.01) | |
| *H01M 8/0276* | (2016.01) | |
| *H01M 8/2483* | (2016.01) | |
| *H01M 8/04089* | (2016.01) | |
| *H01M 8/0273* | (2016.01) | |
| *H01M 8/0206* | (2016.01) | |
| *H01M 8/1018* | (2016.01) | |

(52) U.S. Cl.
CPC ......... *H01M 8/026* (2013.01); *H01M 8/0254* (2013.01); *H01M 8/0267* (2013.01); *H01M 8/0273* (2013.01); *H01M 8/0276* (2013.01); *H01M 8/04089* (2013.01); *H01M 8/241* (2013.01); *H01M 8/2483* (2016.02); *H01M 8/0206* (2013.01); *H01M 2008/1095* (2013.01)

(58) Field of Classification Search
CPC .. H01M 8/026; H01M 8/0254; H01M 8/0267; H01M 8/241; H01M 8/04089; H01M 8/0276; H01M 8/2483
See application file for complete search history.

(56) References Cited

FOREIGN PATENT DOCUMENTS

| | | | |
|---|---|---|---|
| JP | 5239091 | 12/2010 | |
| WO | 2009043600 | 4/2009 | |
| WO | WO-2009043600 A1 * | 4/2009 | .............. H01M 8/02 |

* cited by examiner

*Primary Examiner* — Karie O'Neill Apicella
(74) *Attorney, Agent, or Firm* — Amin, Turocy & Watson, LLP

(57) ABSTRACT

A power generation cell includes a resin film equipped MEA and a first metal separator. The first metal separator includes an oxygen-containing gas flow field, an outer peripheral bead, and a first bypass stopping convex portion. An oxygen-containing gas flows across the oxygen-containing gas flow field along an electrode surface. The outer peripheral bead surrounds the oxygen-containing gas flow field to prevent leakage of a reactant gas. The first bypass stopping convex portion extends from the outer peripheral bead. A corner of a cathode on at least one end in the flow field direction of the oxygen-containing gas flow field is overlapped with an apex portion of the first bypass stopping convex portion.

8 Claims, 8 Drawing Sheets

POWER GENERATION CELL

CROSS-REFERENCE TO RELATED APPLICATION

This application is based upon and claims the benefit of priority from Japanese Patent Application No. 2018-002221 filed on Jan. 10, 2018, the contents of which are incorporated herein by reference.

BACKGROUND OF THE INVENTION

Field of the Invention

The present invention relates to a power generation cell including a metal separator provided with a bead seal surrounding a reactant gas flow field.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly includes a solid polymer electrolyte membrane, an anode provided on one surface of the solid polymer electrolyte membrane, and a cathode on the other surface of the solid polymer electrolyte membrane. The MEA is sandwiched between separators (bipolar plates) to form a power generation cell (unit fuel cell). In use, a predetermined number of power generation cells are stacked together to form, e.g., an in-vehicle fuel cell stack mounted in a vehicle.

In the power generation cell, cases exist in which metal separators are used as the separators. An anode side metal separator, in which a fuel gas flow field is formed for allowing a fuel gas to flow as one reactant gas along an anode, is disposed on one side surface of the MEA, and a cathode side separator, in which an oxygen-containing gas flow field is formed for allowing an oxygen-containing gas to flow as another reactant gas along a cathode, is disposed on another side surface of the MEA.

Incidentally, in Japanese Patent No. 5239091, in order to reduce manufacturing costs, in a metal separator, it has been disclosed to form a convex bead seal as a seal portion (a boundary wall 7) by press forming. Further, in Japanese Patent No. 5239091, in order to prevent the reactant gas from bypassing at an end portion of a reactant gas flow field provided in a flow field widthwise direction in the metal separator, bypass stopping convex portions (restricting members 10) are provided between the bead seal and the reactant gas flow field.

SUMMARY OF THE INVENTION

The present invention has been made in relation to the conventional technique, and an object of the present invention is to provide a power generation cell which makes it possible to more suitably suppress bypassing of a reactant gas in a flow field direction along a bead seal facing an end in the flow field width direction of the reactant gas.

In order to achieve the above object, a power generation cell of the present invention includes a resin film equipped membrane electrode assembly (MEA) and a metal separator provided on each of both sides of the resin film equipped MEA. The resin film equipped MEA includes a membrane electrode assembly including an electrolyte membrane and electrodes provided on both sides of the electrolyte membrane, and a frame-shaped resin film provided over an entire outer peripheral portion of the membrane electrode assembly. A reactant gas flow field configured to allow a reactant gas to flow along a power generation surface from one end to the other end of the metal separator is formed in the metal separator. The power generation cell includes a bead seal configured to be in contact with the resin film and surround the reactant gas flow field to prevent leakage of the reactant gas. A bypass stopping convex portion protruding from a portion of the bead seal that extends from the one end to the other end of the metal separator, toward an end of the reactant gas flow field in a flow field width direction, and being expanded toward the resin film, so as to prevent bypassing of the reactant gas. A corner of the electrode on at least one end in a flow field direction of the reactant gas flow field is overlapped with an apex portion of the bypass stopping convex portion.

Preferably, the bypass stopping convex portion includes a plurality of bypass stopping convex portions that are provided at intervals in the flow field direction of the reactant gas flow field, and the corner of the electrode is overlapped with an apex portion of a bypass stopping convex portion that is at one end in the flow field direction, among the plurality of bypass stopping convex portions.

Preferably, corners of the electrode that are located at ends on both sides in the flow field direction of the reactant gas flow field are overlapped with respective apex portions of the bypass stopping convex portions.

Preferably, the bypass stopping convex portion includes bypass stopping convex portions that are provided respectively on both sides in the flow field width direction of the reactant gas flow field, and the corners of the electrode are overlapped with the apex portions of the bypass stopping convex portions on both sides in the flow field width direction.

Preferably, the metal separator includes a wall which is adjacent to the apex portions of the bypass stopping convex portions and which faces an outer end surface of the electrode.

Preferably, the wall is inclined with respect to the thickness direction of the metal separator.

Preferably, the metal separator includes a support which is adjacent to the wall and configured to support the resin film.

In the power generation cell of the present invention, the corner of the electrode of the resin film equipped MEA on at least one end in the flow field direction of the reactant gas flow field is overlapped with the apex portion of the bypass stopping convex portion. In this manner, it is possible to suppress flow of the reactant gas into the bypass area that extends from the corner of the electrode along the bead seal. Therefore, it is possible to suitably suppress bypassing of the reactant gas in the flow field direction along the bead seal facing the end in the flow field width direction of the reactant gas (i.e., passing of the reactant gas outside the power generation area). Accordingly, it is possible to achieve improvement in the performance of distributing the reactant gas and the power generation efficiency.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a power generation cell according to the present invention will be described with reference to the accompanying drawings.

Figure 1:
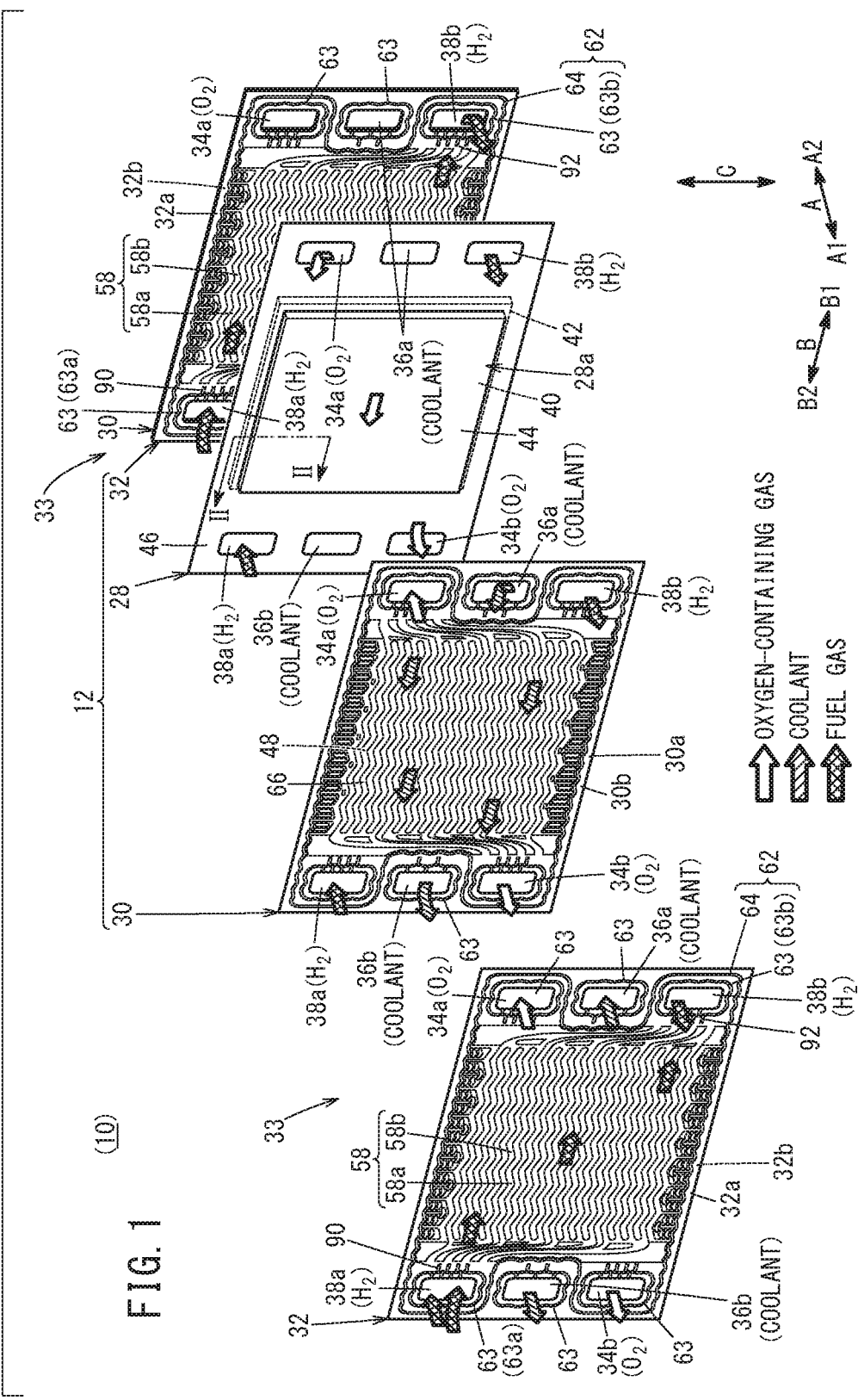
FIG. 1 is an exploded perspective view showing a power generation cell according to an embodiment of the present invention.

A power generation cell 12 that makes up a unit fuel cell shown in FIG. 1 includes a resin film equipped MEA (resin film equipped membrane electrode assembly) 28, a first metal separator 30 provided on one surface of the resin film equipped MEA 28 (in the direction indicated by an arrow A1), and a second metal separator 32 provided on the other surface of the resin film equipped MEA 28 (indicated by an arrow A2). For example, a plurality of the power generation cells 12 are stacked together in a direction indicated by an arrow A (horizontal direction) or in a direction indicated by an arrow C (gravity direction), and a tightening load (compression load) in the stacking direction (indicated by the arrow A) is applied to the power generation cells 12 to form a fuel cell stack 10. For example, the fuel cell stack 10 is mounted in a fuel cell vehicle such as a fuel cell electric automobile (not shown).

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. In adjacent ones of the power generation cells 12, the first metal separator 30 of one power generation cell 12, and the second metal separator 32 of another power generation cell 12 are joined together integrally by welding, brazing, crimping or the like at the outer peripheral portion thereof to thereby constitute a joint separator 33.

At one end of the power generation cell 12 in a longitudinal direction (horizontal direction) (an end in a direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction indicated by an arrow A. The oxygen-containing gas supply passage 34a, the coolant supply passage 36a, and the fuel gas discharge passage 38b are arranged in a vertical direction (indicated by arrow C). An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At another end of the power generation cell 12 in a longitudinal direction (an end in a direction indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the plurality of fuel gas discharge passage 38b is not limited to the above embodiment, and may be changed depending on the required specification.

Figure 2:
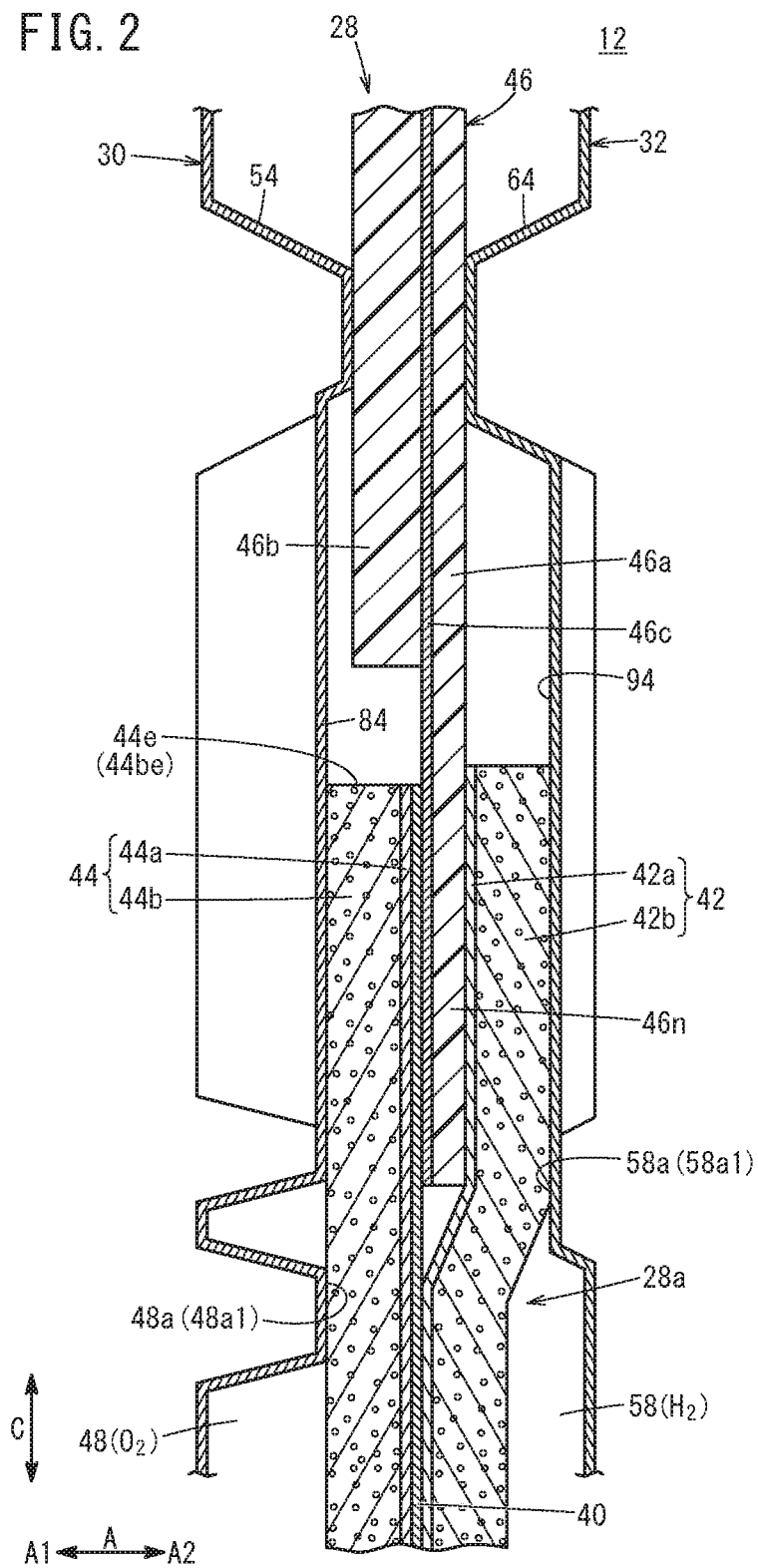
FIG. 2 is a cross sectional view showing the power generation cell taken along line II-II in FIG. 1.

As shown in FIG. 2, the resin film equipped MEA 28 includes a membrane electrode assembly 28a (hereinafter referred to as an "MEA 28a"), and a frame-shaped resin film 46 provided on an outer peripheral portion of the MEA 28a.

The MEA 28a includes an electrolyte membrane 40, and an anode 42 and a cathode 44 provided on both sides of the electrolyte membrane 40. For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is interposed between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on a first electrode catalyst layer 44a. The anode 42 includes a second electrode catalyst layer 42a joined to the other surface of the electrolyte membrane 40, and a second gas diffusion layer 42b stacked on the second electrode catalyst layer 42a.

The first electrode catalyst layer 44a and the second electrode catalyst layer 42a are formed on both surfaces of the electrolyte membrane 40. For example, the first electrode catalyst layer 44a is formed by porous carbon particles deposited uniformly on the surface of the first gas diffusion layer 44b together with an ion conductive polymer binder and platinum alloy supported on the porous carbon particles. For example, the second electrode catalyst layer 42a is formed by porous carbon particles deposited uniformly on the surface of the second gas diffusion layer 42b together with an ion conductive polymer binder and platinum alloy supported on the porous carbon particles. The first gas diffusion layer 44b and the second gas diffusion layer 42b are made of carbon paper or carbon cloth, etc.

As shown in FIG. 1, at an end of the resin film 46 in the direction indicated by the arrow B1, an oxygen-containing gas supply passage 34a, a coolant supply passage 36a, and a fuel gas discharge passage 38b are provided. At an end of the resin film 46 in the direction indicated by the arrow B2, a fuel gas supply passage 38a, a coolant discharge passage 36b, and an oxygen-containing gas discharge passage 34b are provided.

As shown in FIG. 2, the resin film 46 includes two frame-shaped sheets 46a, 46b having different thicknesses. Specifically, the resin film 46 includes a first frame-shaped sheet 46a and a second frame-shaped sheet 46b. The inner peripheral portion of the first frame-shaped sheet 46a is joined to the outer circumferential portion of the MEA 28a. The second frame-shaped sheet 46b is joined to the first frame-shaped sheet 46a. The first frame-shaped sheet 46a and the second frame-shaped sheet 46b are joined together in the thickness direction using an adhesive layer 46c made of adhesive. The second frame-shaped sheet 46b is joined to the outer peripheral portion of the first frame-shaped sheet 46a. The first frame-shaped sheet 46a and the second frame-shaped sheet 46b may have the same thickness.

Each of the first frame-shaped sheet 46a and the second frame-shaped sheet 46b is made of resin material. Examples of materials used for the first frame-shaped sheet 46a and the second frame-shaped sheet 46b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

An inner peripheral portion 46n of the resin film 46 (inner peripheral portion of the first frame-shaped sheet 46a) is positioned between the outer peripheral portion of the anode 42 and the outer peripheral portion of the cathode 44. Specifically, the inner peripheral portion 46n of the resin film 46 is held between the outer peripheral portion of the electrolyte membrane 40 and the outer peripheral portion of the anode 42. The inner peripheral portion 46n of the resin film 46 and the outer peripheral portion of the electrolyte membrane 40 are joined together through an adhesive layer 46c. It should be noted that the inner peripheral portion 46n of the resin film 46 may be held between the electrolyte membrane 40 and the cathode 44.

The electrolyte membrane 40 may be formed to protrude outward without using the resin film 46. Further, a frame-shaped film may be provided on both sides of the electrolyte membrane 40 which protrudes outward.

Figure 3:
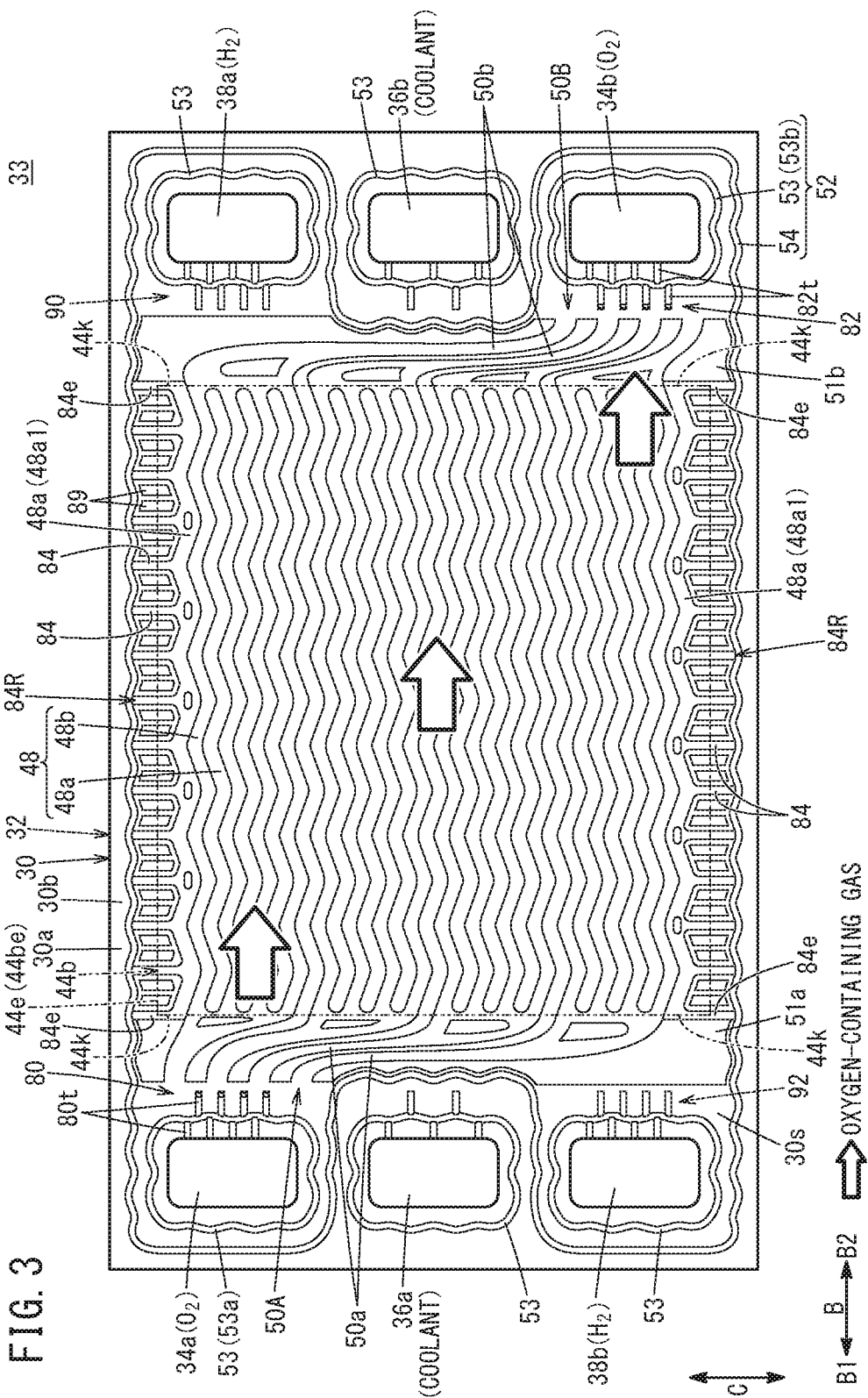
FIG. 3 is a plan view showing a joint separator as viewed from a first metal separator.

As shown in FIG. 3, the first metal separator 30 has an oxygen-containing gas flow field 48 on its surface 30a (hereinafter referred to as the "surface 30a" facing the resin film equipped MEA 28 of the first metal separator 30 (see FIG. 1). The oxygen-containing gas flow field 48 extends in the direction indicated by the arrow B. The oxygen-containing gas flow field 48 is connected to (in fluid communication with) the oxygen-containing gas supply passage 34a and the oxygen-containing gas discharge passage 34b. The oxygen-containing gas flow field 48 includes a plurality of wavy flow grooves 48b formed between a plurality of wavy ridges 48a extending in the direction indicated by the arrow B. Therefore, in the oxygen-containing gas flow field 48, a plurality of wavy ridges 48a and a plurality of wavy flow grooves 48b are arranged alternately in the flow field width direction (indicated by the arrow C). In the oxygen-containing gas flow field 48, instead of adopting the above structure, a plurality of straight flow grooves may be formed between a plurality of straight ridges.

Side walls of the wavy ridge 48a on both sides in the width direction indicated by the arrow C are inclined with respect to the separator thickness direction. Therefore, the wavy ridge 48a has a trapezoidal shape in lateral cross section. It should be noted that the side walls of the wavy ridge 48a on both side in the width direction may be in parallel with the separator thickness direction, and the wavy ridge 48a may have a rectangular shape in lateral cross section. Hereinafter, among the plurality of wavy ridges 48a, ridges provided at both ends in the flow field width direction will be referred to as the "end wavy ridges 48a1". The end wavy ridges 48a1 are provided inside the outer end surface 44be of the first gas diffusion layer 44b.

A first inlet connection channel section 50A is provided on the surface 30a of the first metal separator 30. The first inlet connection channel section 50A connects the oxygen-containing gas supply passage 34a and the oxygen-containing gas flow field 48. In the embodiment of the present invention, the first inlet connection channel section 50A includes a plurality of first inlet connection flow grooves 50a. The first inlet connection flow grooves 50a are connected to the plurality of wavy flow grooves 48b. In the surface 30a of the first metal separator 30, a first inlet elevated part 51a is formed adjacent to one side of the oxygen-containing gas flow field 48 in the direction indicated by the arrow B1. The first inlet elevated part 51a is elevated from a base plate part 30s of the first metal separator 30 toward the resin film equipped MEA 28. The first inlet elevated part 51a extends from a position adjacent to the inner side of a bead seal 54 (described later) at one end in the flow field width direction (indicated by the arrow C) to a position adjacent to the inner side of the bead seal 54 at the other end in the flow field width direction (indicated by the arrow C). The plurality of first inlet connection flow grooves 50a are formed in the first inlet elevated part 51a.

Further, a first outlet connection channel section 50B is provided on the surface 30a of the first metal separator 30. The first outlet connection channel section 50B connects the oxygen-containing gas flow field 48 and the oxygen-containing gas discharge passage 34b. In the embodiment of the present invention, the first outlet connection channel section 50B includes a plurality of first outlet connection flow grooves 50b. The first outlet connection flow grooves 50b are connected to the plurality of wavy flow grooves 48b. In the surface 30a of the first metal separator 30, a first outlet elevated part 51b is formed adjacent to another side of the oxygen-containing gas flow field 48 in the direction indicated by the arrow B2. The first outlet elevated part 51b is elevated from the base plate part 30s of the first metal separator 30 toward the resin film equipped MEA 28. The first outlet elevated part 51b extends from a position adjacent to the inner side of the bead seal 54 (described later) at one end in the flow field width direction (indicated by the arrow C) to a position adjacent to the inner side of the bead seal 54 at the other end in the flow field width direction (indicated by the arrow C). The plurality of first outlet connection flow grooves 50b are formed in the first outlet elevated part 51b.

First seal lines 52 are formed on the surface 30a of the first metal separator 30 by press forming. The first seal lines 52 protrude toward the resin film equipped MEA 28 (FIG. 1). Though not shown, on a projecting end surface of the first seal lines 52, a resin material may be fixed and attached thereto by printing or coating, etc. Such a resin material need not necessarily be used.

The first seal lines 52 include a plurality of bead seals 53 provided around a plurality of fluid passages (oxygen-containing gas supply passage 34a, etc.), respectively (hereinafter referred to as the "passage beads" 53), and a bead seal 54 provided around the oxygen-containing gas flow field 48, the first inlet connection channel section 50A, and the first outlet connection channel section 50B (hereinafter referred to as the "outer peripheral bead 54").

The plurality of passage beads 53 protrude from the surface 30a of the first metal separator 30 toward the resin film equipped MEA 28, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 53, a passage bead provided around the oxygen-containing gas supply passage 34a will be referred to as the "passage bead 53a", and a passage bead provided around the oxygen-containing gas discharge passage 34b will be referred to as the "passage bead 53b".

The first metal separator 30 has bridge sections 80, 82 connecting the inside (fluid passages 34a, 34b) of the passage beads 53a, 53b and the outside (oxygen-containing gas flow field 48) of the passage beads 53a, 53b. The bridge section 80 is provided on a side part of the passage bead 53a formed around the oxygen-containing gas supply passage 34a, adjacent to the oxygen-containing gas flow field 48. The bridge section 82 is provided on a side part of the passage bead 53b formed around the oxygen-containing gas discharge passage 34b, adjacent to the oxygen-containing gas flow field 48.

The bridge sections 80, 82 include a plurality of tunnels 80t, 82t provided inside and outside the passage beads 53a, 53b, respectively. The tunnels 80t, 82t are formed by press forming in a manner that the tunnels 80t, 82t protrude from the surface 30a of the first metal separator 30 toward the resin film equipped MEA 28.

First bypass stopping convex portions 84 are provided between each of both ends in the flow field width direction of the oxygen-containing gas flow field 48 (end wavy ridges 48a1) and the outer peripheral bead 54. The first bypass stopping convex portions 84 prevent bypassing of the oxygen-containing gas from the oxygen-containing gas supply passage 34a to the oxygen-containing gas discharge passage 34b. In the embodiment of the present invention, the flow field width direction of the oxygen-containing gas flow field 48 is a direction (indicated by the arrow C) along the short sides of the rectangular first metal separator 30. The first bypass stopping convex portions 84 are formed to protrude toward the resin film equipped MEA 28 (see FIG. 2). Each of the first bypass stopping convex portions 84 has one end connected to the outer peripheral bead 54, and the other end connected to the end wavy ridge 48a1. The height of the first bypass stopping convex portions 84 is smaller than the height of the outer peripheral bead 54.

The first bypass stopping convex portions 84 are arranged at intervals in the direction in which the end wavy ridge 48a1 extends (in the direction indicated by the arrow B). The first bypass stopping convex portions 84 arranged in the direction indicated by the arrow B form a first bypass stopping convex portion array 84R. Hereinafter, the first bypass stopping convex portions 84 positioned at both ends of the first bypass stopping convex portion array 84R will be referred to as the "first bypass stopping convex portions 84e".

Figure 4:
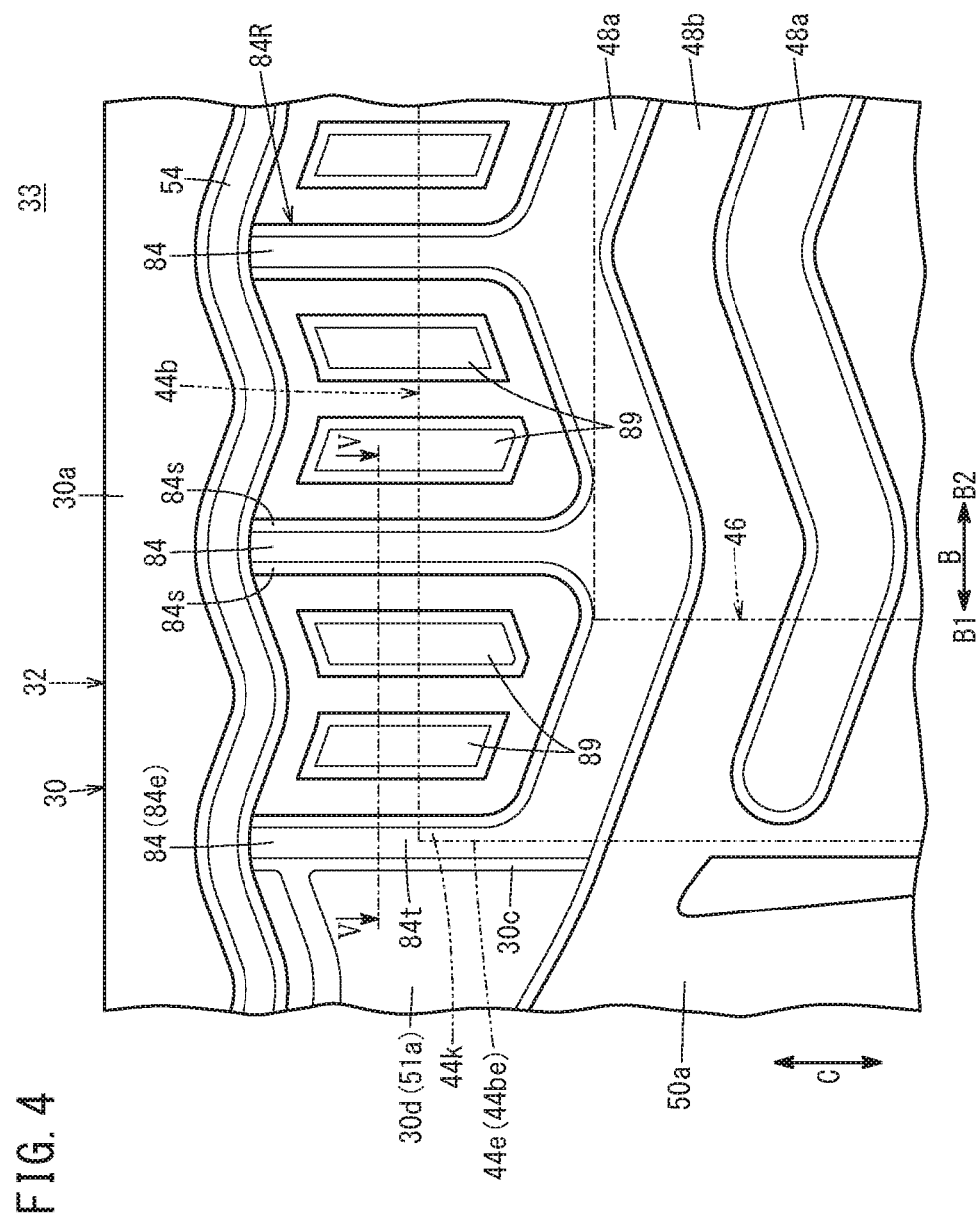
FIG. 4 is an enlarged plan view showing main components of the first metal separator.

In FIG. 4, side walls 84s of the first bypass stopping convex portion 84 on both sides in the width direction (indicated by the arrow B) thereof are inclined with respect to the separator thickness direction, and the first bypass stopping convex portion 84 has a trapezoidal shape in lateral cross section. It should be noted that the side walls 84s of the first bypass stopping convex portion 84 may be in parallel with the separator, and the first bypass stopping convex portion 84 may have a rectangular shape in lateral cross section.

Intermediate convex portions 89 are provided between the adjacent first bypass stopping convex portions 84. The intermediate convex portions 89 support the outer peripheral portion of the MEA 28a. The intermediate convex portions 89 protrude toward the resin film equipped MEA 28. A plurality of the intermediate convex portions 89 are provided in each space between the adjacent first bypass stopping convex portions 84. The first bypass stopping convex portions 84 and the intermediate convex portions 89 have the same height.

Figure 5:
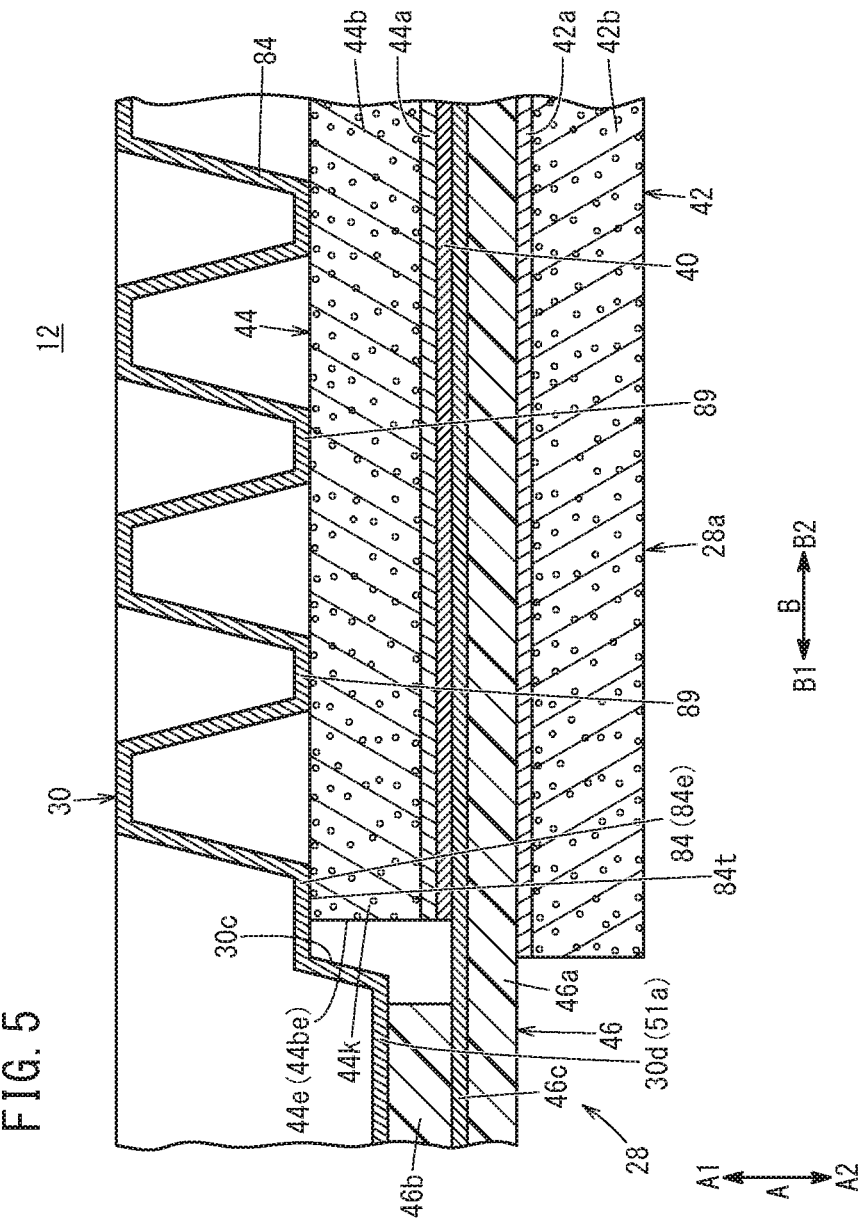
FIG. 5 is a cross sectional view showing the power generation cell taken along line V-V in FIG. 4.

As shown in FIGS. 4 and 5, a corner 44k of the cathode 44 (specifically, the first gas diffusion layer 44b) at an end in the flow field direction (in the direction indicated by the arrow B) of the oxygen-containing gas flow field 48 is overlapped with an apex portion 84t of the first bypass stopping convex portion 84e provided at an end in the first bypass stopping convex portion array 84R. Therefore, the apex portion 84t of the first bypass stopping convex portion 84e is in contact or abutment with the corner 44k of the cathode 44. In FIG. 5, the second metal separator 32 is not shown.

The first metal separator 30 includes a wall 30c which is adjacent to the apex portion 84t of the first bypass stopping convex portion 84e and faces an outer end surface 44e of the cathode 44 (outer end surface 44be of the first gas diffusion layer 44b). The wall 30c extends from the apex portion 84t of the first bypass stopping convex portion 84e toward the resin film 46. A minute gap may be formed between the wall 30c and the outer end surface 44e of the cathode 44. The wall 30c may be in contact with the outer end surface 44e of the cathode 44.

The wall 30c is inclined with respect to the thickness direction (indicated by an arrow A) of the first metal separator 30. The wall 30c may be in parallel with the thickness direction of the first metal separator 30. The first metal separator 30 includes a support 30d which is adjacent to the wall 30c and supports the resin film 46. The above first inlet elevated part 51a forms the support 30d. The wall 30c forms a step between the apex portion 84t of the first bypass stopping convex portion 84e and the support 30d.

In FIG. 3, though not shown in detail, as in the case of the corner 44k adjacent to the oxygen-containing gas supply passage 34a, each of the other three corners 44k of the rectangular cathode 44 (corners 44k adjacent to the oxygen-containing gas discharge passage 34b, the fuel gas supply passage 38a, and the fuel gas discharge passage 38b) is overlapped with the apex portion 84t of the first bypass stopping convex portion 84e provided at an end of the first bypass stopping convex portion array 84R. Further, also at each of the positions corresponding to the other three corners 44k, the first metal separator 30 has the wall 30c which is adjacent to the apex portion 84t of the first bypass stopping convex portion 84e and faces the outer end surface 44e of the cathode 44.

Figure 6:
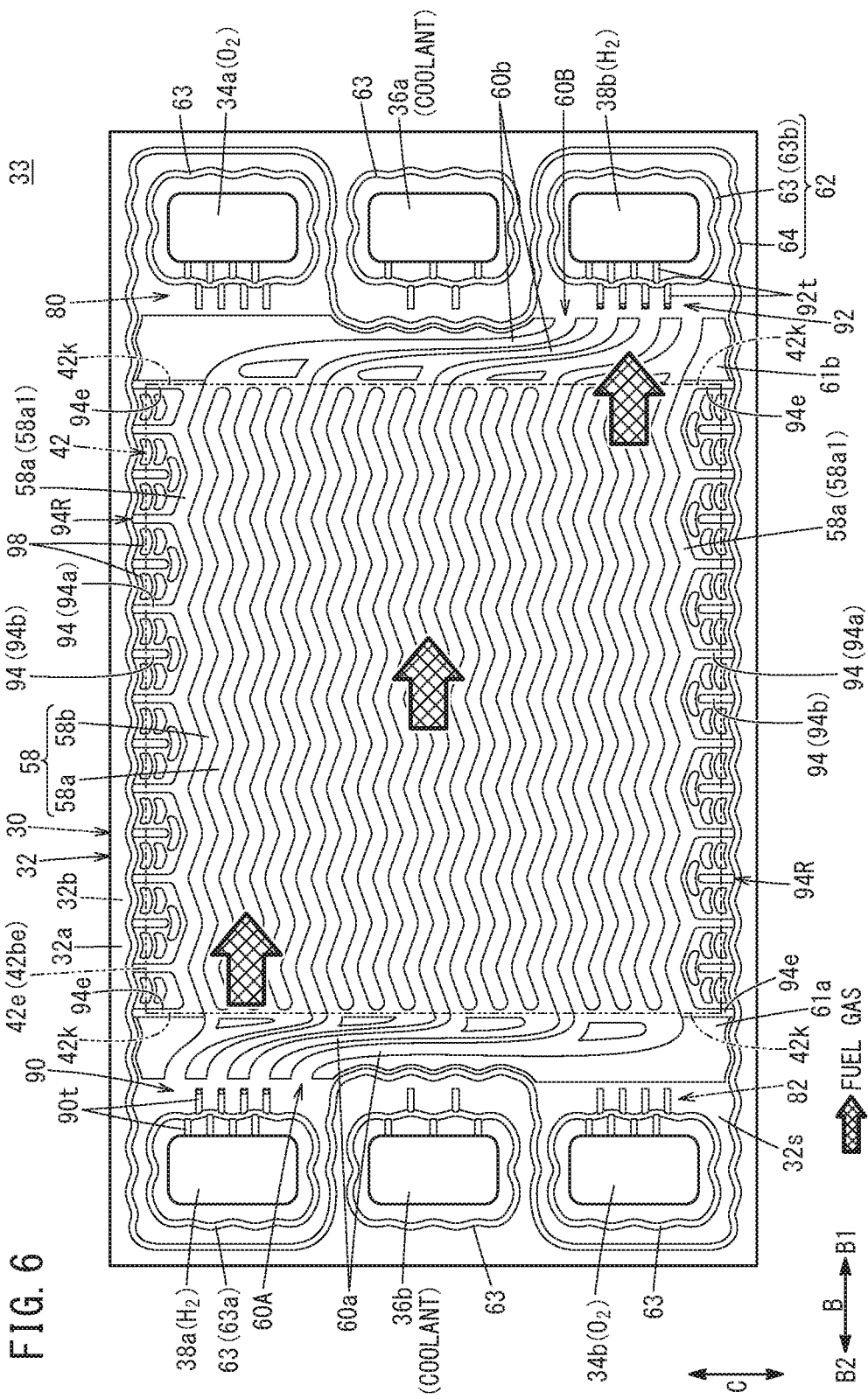
FIG. 6 is a plan view showing a joint separator as viewed from the second metal separator.

As shown in FIG. 6, the second metal separator 32 has a fuel gas flow field 58 on its surface 32a facing the resin film equipped MEA 28 (FIG. 1) (hereinafter referred to as the "surface 32a"). For example, the fuel gas flow field 58 extends in the direction indicated by the arrow B.

The fuel gas flow field 58 is connected to (in fluid communication with) the fuel gas supply passage 38a and the fuel gas discharge passage 38b. The fuel gas flow field 58 includes a plurality of wavy flow grooves 58b formed between a plurality of wavy ridges 58a extending in the direction indicated by the arrow B. Therefore, in the fuel gas flow field 58, a plurality of wavy ridges 58a and a plurality of wavy flow grooves 58b are arranged alternately in the flow field width direction (indicated by the arrow C). Instead of adopting the above structure, the fuel gas flow field 58 may have a plurality of straight flow grooves between a plurality of straight ridges. Hereinafter, among the plurality of wavy ridges 58a, wavy ridges positioned at both ends in the flow field width direction will be referred to as the "end wavy ridges 58a1". The end wavy ridge 58a1 is provided inside the outer end surface 42be of the second gas diffusion layer 42b.

A second inlet connection channel section 60A is provided on the surface 32a of the second metal separator 32. The second inlet connection channel section 60A connects the fuel gas supply passage 38a and the fuel gas flow field 58. In the embodiment of the present invention, the second inlet connection channel section 60A includes a plurality of second inlet connection flow grooves 60a. The second inlet connection flow grooves 60a are connected to the plurality of wavy flow grooves 58b. In the surface 32a of the second metal separator 32, a second inlet elevated part 61a is formed adjacent to one side of the fuel gas flow field 58 in the direction indicated by the arrow B2. The second inlet elevated part 61a is elevated from a base plate part 32s of the second metal separator 32 toward the resin film equipped MEA 28. The second inlet elevated part 61a extends from a position adjacent to the inner side of a bead seal 64 (described later) at one end in the flow field width direction (indicated by the arrow C) to a position adjacent to the inner side of the bead seal 64 at the other end in the flow field width direction (indicated by the arrow C). The plurality of second inlet connection flow grooves 60a are formed in the second inlet elevated part 61a.

Further, a second outlet connection channel section 60B is provided on the surface 32a of the second metal separator 32. The second outlet connection channel section 60B connects the fuel gas flow field 58 and the fuel gas discharge passage 38b. In the embodiment of the present invention, the second outlet connection channel section 60B includes a plurality of second outlet connection flow grooves 60b. The second outlet connection flow grooves 60b are connected to the plurality of wavy flow grooves 58b. In the surface 32a of the second metal separator 32, a second outlet elevated part 61b is formed adjacent to another side of the fuel gas flow field 58 in the direction indicated by the arrow B1. The second outlet elevated part 61b is elevated from the base plate part 32s of the second metal separator 32 toward the resin film equipped MEA 28. The second outlet elevated part 61b extends from a position adjacent to the inner side of the bead seal 64 (described later) at one end in the flow field width direction (indicated by the arrow C) to a position adjacent to the inner side of the bead seal 64 at the other end in the flow field width direction (indicated by the arrow C). The plurality of second outlet connection flow grooves 60b are formed in the second outlet elevated part 61b.

Second seal lines 62 are formed on the surface 32a of the second metal separator 32 by press forming. The second seal lines 62 protrude toward the resin film equipped MEA 28. Though not shown in detail, on a projecting end surface of the second seal lines 62, a resin material is fixed and attached thereto by printing or coating, etc. Such a resin material need not necessarily be used.

As shown in FIG. 6, the second seal lines 62 include a plurality of bead seals 63 provided around a plurality of fluid passages (fluid passage 38a, etc.), respectively (hereinafter referred to as the "passage beads" 63), and a bead seal 64 provided around the fuel gas flow field 58, the second inlet connection channel section 60A, and the second outlet connection channel section 60B (hereinafter referred to as the "outer peripheral bead 64").

The plurality of passage beads 63 protrude from the surface 32a of the second metal separator 32, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 63, a passage bead provided around the fuel gas supply passage 38a will be referred to as the "passage bead 63a", and a passage bead provided around the fuel gas discharge passage 38b will be referred to as the "passage bead 63b".

The second metal separator 32 has bridge sections 90, 92 around the fuel gas supply passage 38a and the fuel gas discharge passage 38b, respectively, connecting the inside (fluid passages 38a, 38b) of the passage beads 63a, 63b and the outside (fuel gas flow field 58) of the passage beads 63a, 63b. The bridge section 90 is provided on a side part of the passage bead 63a formed around the fuel gas supply passage 38a, adjacent to the fuel gas flow field 58. The bridge section 92 is provided on a side part of the passage bead 63b formed around the fuel gas discharge passage 38b, adjacent to the fuel gas flow field 58.

The bridge sections 90, 92 include a plurality of tunnels 90t, 92t inside and outside the passage beads 63a, 63b. The tunnels 90t, 92t are formed by press forming to protrude from the surface 32a of the second metal separator 32 toward the resin film equipped MEA 28.

Second bypass stopping convex portions 94 are provided between each of both ends of the fuel gas flow field 58 (end wavy ridges 58a1) in the flow field width direction and the outer peripheral bead 64. The second bypass stopping convex portions 94 prevent bypassing of the fuel gas from the fuel gas supply passage 38a to the fuel gas discharge passage 38b. In the embodiment of the present invention, the flow field width direction of the fuel gas flow field 58 is a direction (indicated by the arrow C) along the short sides of the rectangular second metal separator 32. The second bypass stopping convex portions 94 are formed to protrude toward the resin film equipped MEA 28 (see FIG. 2). The height of the second bypass stopping convex portions 94 is lower than the height of the outer peripheral bead 64.

The second bypass stopping convex portions 94 are arranged at intervals in the direction (indicated by the arrow B) in which the wavy flow grooves 58b extend. The plurality of second bypass stopping convex portions 94 arranged in the direction indicated by the arrow B form a second bypass stopping convex portion array 94R. Hereinafter, the second bypass stopping convex portions 94 positioned at both ends of the second bypass stopping convex portion array 94R will be referred to as the "second bypass stopping convex portions 94e".

Each of the second bypass stopping convex portions 94 protrudes from the outer peripheral bead 64, and extends in the flow field width direction of the fuel gas flow field 58. One end of each of the second bypass stopping convex portions 94 is connected to the outer peripheral bead 64. Some of the plurality of second bypass stopping convex portions 94 each have the other end connected to the end wavy ridge 58a1 (hereinafter referred to as the "second bypass stopping convex portions 94a), and the other second bypass stopping convex portions 94 each have the other end which is not connected to the end wavy ridge 58a1 (which is spaced from the end wavy ridge 58a1) (hereinafter referred to as the "second bypass stopping convex portions 94b").

The second bypass stopping convex portions 94e provided at both ends of the second bypass stopping convex portion array 94R are second bypass stopping convex portions 94a each having the other end connected to the end wavy ridge 58a1. In the same manner as in the case of the first bypass stopping convex portions 84 (FIG. 3), all of the plurality of second bypass stopping convex portions 94 (94a and 94b) may be connected to the end wavy ridge 58a1.

Intermediate convex portions 98 supporting the outer peripheral portion of the MEA 28a are provided between the adjacent second bypass stopping convex portions 94a, 94b. The intermediate convex portions 98 protrude toward the resin film equipped MEA 28. A plurality of the intermediate convex portions 98 are provided in each space between the adjacent second bypass stopping convex portions 94a, 94b. The second bypass stopping convex portions 94a, 94b and the intermediate convex portions 98 have the same height.

Figure 7:
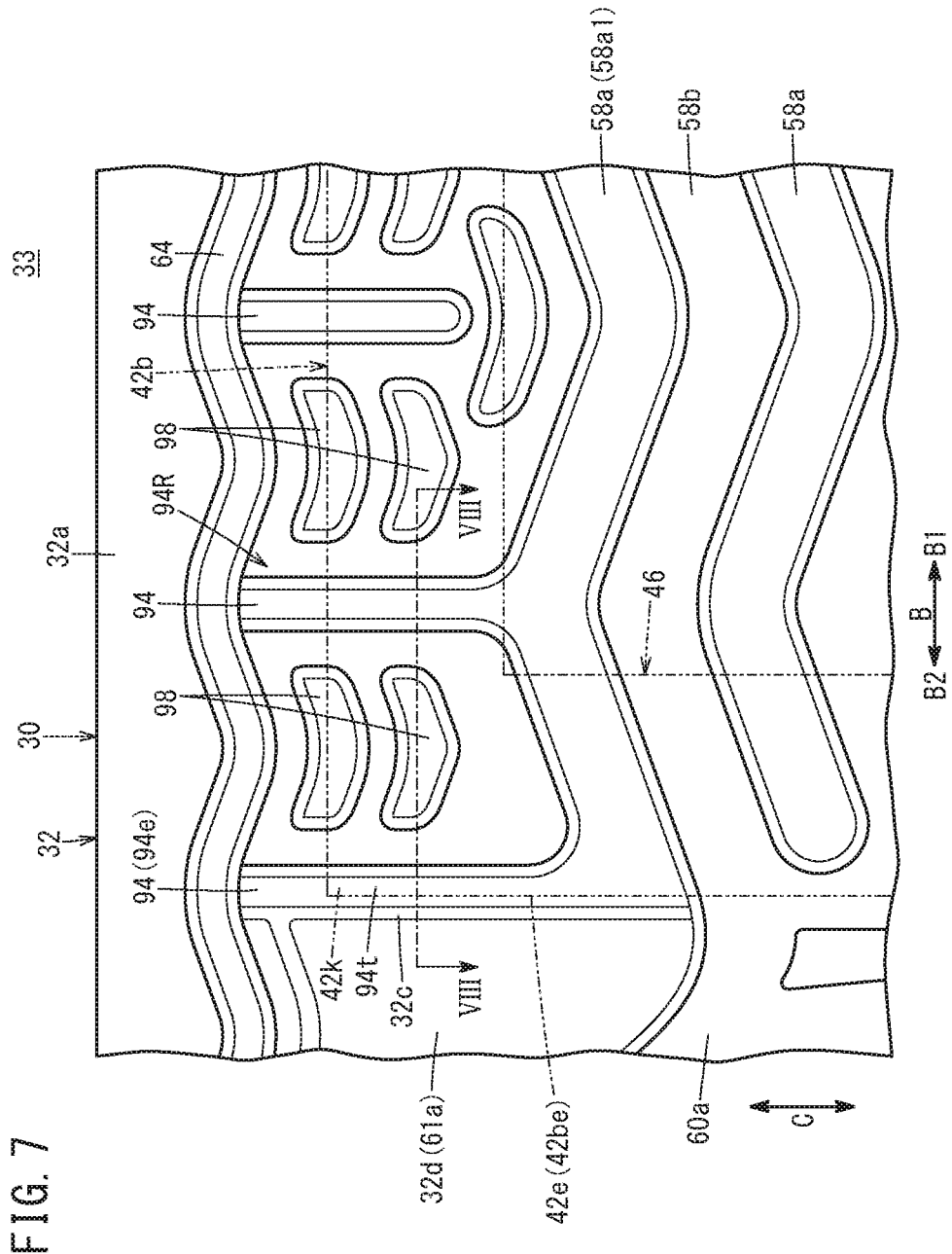
FIG. 7 is an enlarged plan view showing main components of a second metal separator.
Figure 8:
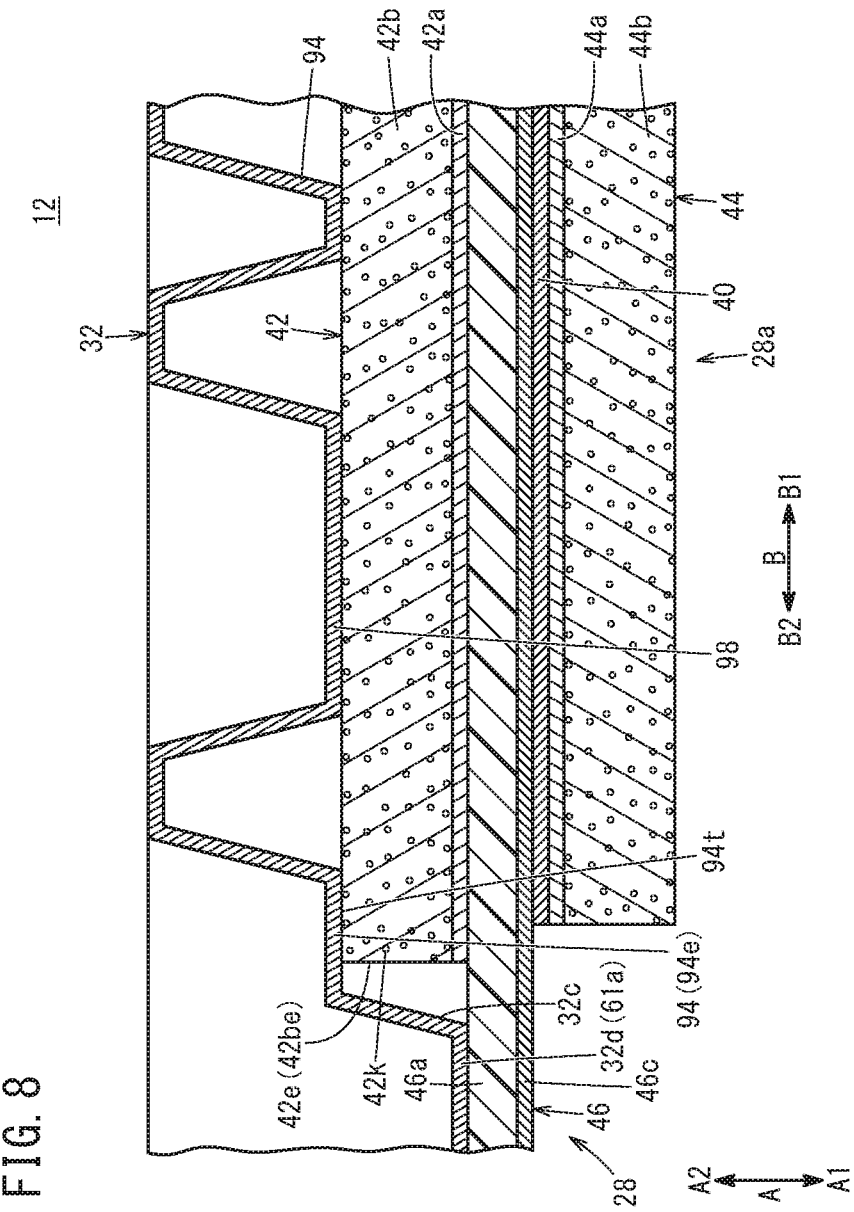
FIG. 8 is a cross sectional view taken along line VIII-VIII in FIG. 7.

As shown in FIGS. 7 and 8, a corner 42k of the anode 42 (specifically, the second gas diffusion layer 42b) at an end in the flow field direction (indicated by the arrow B) of the fuel gas flow field 58 is overlapped with an apex portion 94t of the second bypass stopping convex portion 94e provided at an end in the second bypass stopping convex portion array 94R. Therefore, the apex portion 94t of the second bypass stopping convex portion 94 is in contact or abutment with the corner 42k of the anode 42. In FIG. 8, the first metal separator 30 is not shown.

The second metal separator 32 includes a wall 32c which is adjacent to the apex portion 94t of the second bypass stopping convex portion 94 and faces an outer end surface 42e of the anode 42 (outer end surface 42be of the second gas diffusion layer 42b). The wall 32c is bent from the apex portion 94t of the second bypass stopping convex portion 94 toward the resin film 46. A minute gap is formed between the wall 32c and the outer end surface 42e of the anode 42. The wall 32c may be in contact with the outer end surface 42e of the anode 42.

The wall 32c is inclined with respect to the thickness direction (indicated by an arrow A) of the second metal separator 32. The wall 32c may be in parallel with the thickness direction of the second metal separator 32. The second metal separator 32 includes a support 32d which is adjacent to the wall 32c and supports the resin film 46. The above second inlet elevated part 61a forms the support 32d. The wall 32c forms a step between the apex portion 94t of the second bypass stopping convex portion 94 and the support 32d. Only one of the wall 30c of the first metal separator 30 (FIG. 5) and the wall 32c of the second metal separator 32 (FIG. 8) may be provided.

In FIG. 6, though not shown in detail, as in the case of the corner 42k adjacent to the fuel gas supply passage 38a, each of the other three corners 42k of the rectangular anode 42 (corners 42k adjacent to the fuel gas discharge passage 38b, the oxygen-containing gas supply passage 34a, and the oxygen-containing gas discharge passage 34b) is overlapped with the apex portion 94t of the second bypass stopping convex portion 94e provided at an end of the second bypass stopping convex portion array 94R as well. Further, also at each of the positions corresponding to the other three corners 42k, the second metal separator 32 has the wall 32c which is adjacent to the apex portion 94t of the second bypass stopping convex portion 94 and faces the outer end surface 42e of the anode 42.

As shown in FIG. 1, a coolant flow field 66 is formed between the surface 30b of the first metal separator 30 and the surface 32b of the second metal separator 32 that are joined together. The coolant flow field 66 is connected to (in fluid communication with) the coolant supply passage 36a and the coolant discharge passage 36b. When the first metal separator 30 and the second metal separator 32 are stacked together, the coolant flow field 66 is formed between a surface of the first metal separator 30 on the back of the oxygen-containing gas flow field 48, and a surface of the second metal separator 32 on the back of the fuel gas flow field 58.

Operation of the power generation cell 12 having the above structure will be described below.

Firstly, as shown in FIG. 1, an oxygen-containing gas such as air is supplied to the oxygen-containing gas supply passage 34a. A fuel gas such as the hydrogen-containing gas is supplied to the fuel gas supply passage 38a. A coolant such as the pure water, ethylene glycol, oil is supplied to the coolant supply passage 36a.

As shown in FIG. 3, the oxygen-containing gas flows from the oxygen-containing gas supply passage 34a into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28a (see FIG. 2).

In the meanwhile, as shown in FIG. 6, the fuel gas flows from the fuel gas supply passage 38a into the fuel gas flow field 58 of the second metal separator 32. The fuel gas flows along the fuel gas flow field 58 in the direction indicated by the arrow B, and the fuel gas is supplied to the anode 42 of the MEA 28a (see FIG. 2).

Thus, in each MEA 28a, the oxygen-containing gas supplied to the cathode 44 and the fuel gas supplied to the anode 42 are consumed in electrochemical reactions in the first electrode catalyst layer 44a and the second electrode catalyst layer 42a to generate electricity.

Then, as shown in FIG. 1, the oxygen-containing gas supplied to the cathode 44 and partially consumed at the cathode 44, flows from the oxygen-containing gas flow field 48 into the oxygen-containing gas discharge passage 34b. The oxygen-containing gas is discharged along the oxygen-containing gas discharge passage 34b in the direction indicated by the arrow A. Likewise, the fuel gas supplied to the anode 42 and partially consumed at the anode 42, flows from the fuel gas flow field 58 into the fuel gas discharge passage 38b. The fuel gas is discharged along the fuel gas discharge passage 38b in the direction indicated by the arrow A.

Further, the coolant supplied to the coolant supply passages 36a flows into the coolant flow field 66 formed between the first metal separator 30 and the second metal separator 32, and then, the coolant flows in the direction indicated by the arrow B. After the coolant cools the MEA 28a, the coolant is discharged from the coolant discharge passages 36b.

In this case, the power generation cell 12 according to the embodiment of the present invention offers the following advantages.

Hereinafter, as a representative example, the advantages of the embodiment of the present invention will be described in connection with the layout structure of the cathode 44 and the first bypass stopping convex portion 84 formed on the first metal separator 30. However, the same advantages are offered also in the layout structure of the anode 42 and the second bypass stopping convex portion 94 formed on the second metal separator 32.

In the power generation cell 12, the corner 44k of the cathode 44 of the resin film equipped MEA 28 on at least one end of the oxygen-containing gas flow field 48 in the flow field direction is overlapped with the apex portion 84t of the first bypass stopping convex portion 84e. In the structure, it is possible to suppress flow of the reactant gas (oxygen-containing gas) from the corner 44k of the cathode 44 into the bypass area along the outer peripheral bead 54. Therefore, it is possible to suitably suppress bypassing of the reactant gas in the flow field direction, along the outer peripheral bead 54 facing the end in the flow field width direction of the oxygen-containing gas flow field 48 (i.e., passing of the reactant gas outside the power generation area). Accordingly, it is possible to achieve improvement in the performance of distributing the reactant gas and the power generation efficiency.

In the embodiment of the present invention, a plurality of the first bypass stopping convex portions 84 are provided at intervals in the flow field direction of the oxygen-containing gas flow field 48. Further, the corner 44k of the cathode 44 is overlapped with the apex portion 84t of the first bypass stopping convex portion 84e positioned at the end in the flow field direction, among the plurality of the first bypass stopping convex portions 84 (first bypass stopping convex portion array 84R). In the structure, it is possible to more suitably suppress flow of the reactant gas into the bypass area.

In the embodiment of the present invention, the corners 44k of the cathode 44 at the ends on both sides in the flow field direction of the oxygen-containing gas flow field 48 are overlapped with the respective apex portions 84t of the first bypass stopping convex portion 84e. In the structure, it is possible to more suitably suppress flow of the reactant gas into the bypass area.

In the embodiment of the present invention, the first bypass stopping convex portions 84 are provided on both sides in the flow field width direction of the oxygen-containing gas flow field 48, respectively. Further, the corner 44k of the cathode 44 is overlapped with the apex portion 84t of the first bypass stopping convex portion 84e on each of both sides of the oxygen-containing gas flow field 48 in the flow field width direction. In the structure, since flow of the reactant gas into the bypass area on both sides in the flow field width direction of the oxygen-containing gas flow field 48 is suppressed, further improvement in the performance of distributing the reactant gas and the power generation efficiency is achieved.

The first metal separator 30 includes the wall 30c. The wall 30c is adjacent to the apex portion 84t of the first bypass stopping convex portion 84, and faces the outer end surface 44e of the cathode 44. In the structure, since the gap around the corner 44k of the cathode 44 becomes small, it is possible to more suitably suppress the flow of the reactant gas into the bypass area.

The present invention is not limited to the above described embodiment. It is a matter of course that various modifications may be made without departing from the gist of the present invention.

What is claimed is:

1. A power generation cell comprising:
   a resin film equipped membrane electrode assembly; and
   a metal separator provided on each of both sides of the resin film equipped membrane electrode assembly,
   wherein the resin film equipped membrane electrode assembly comprises:
   a membrane electrode assembly including an electrolyte membrane and electrodes provided on both sides of the electrolyte membrane; and
   a frame-shaped resin film provided over an entire outer peripheral portion of the membrane electrode assembly,
   a reactant gas flow field configured to allow a reactant gas to flow along a power generation surface from one end to another end of the metal separator is formed in the metal separator;
   wherein the reactant gas flow field includes ridges protruding toward the membrane electrode assembly and extending from the one end to the other end of the metal separator, and flow grooves defined between the ridges and recessed away from the membrane electrode assembly, the ridges including end ridges at ends in a flow field width direction of the reactant gas flow field, and
   wherein the power generation cell includes a bead seal configured to be in contact with the resin film and surround the reactant gas flow field to prevent leakage of the reactant gas,
   a bypass area formed between the end ridges of the reactant gas flow field and the bead seal; and
   a bypass stopping convex portion protruding from a portion of the bead seal that extends from the one end to the other end of the metal separator, toward the ends of the reactant gas flow field in the flow field width direction so as to be connected to the end ridges of the reactant gas flow field, and being expanded toward the resin film, so as to prevent bypassing of the reactant gas; and
   a corner of the electrode on at least one end in a flow field direction of the reactant gas flow field is overlapped with an apex portion of the bypass stopping convex portion, and
   wherein the bypass stopping convex portion comprises a plurality of bypass stopping convex portions that are provided at intervals in the flow field direction of the reactant gas flow field,
   intermediate convex portions are provided between adjacent bypass stopping convex portions, and
   the intermediate convex portions protrude toward the membrane electrode assembly to support an outer peripheral portion of the membrane electrode assembly.

2. The power generation cell according to claim 1, wherein
   the corner of the electrode is overlapped with an apex portion of a bypass stopping convex portion that is located at one end in the flow field direction, among the plurality of bypass stopping convex portions.

3. The power generation cell according to claim 1, wherein corners of the electrode that are located at ends on both sides in the flow field direction of the reactant gas flow field are overlapped with respective apex portions of the bypass stopping convex portions.

4. The power generation cell according to claim 1, wherein the bypass stopping convex portion comprises bypass stopping convex portions that are provided respectively on both sides in the flow field width direction of the reactant gas flow field; and
   the corners of the electrode are overlapped with the apex portions of the bypass stopping convex portions on both sides in the flow field width direction.

5. The power generation cell according to claim 1, wherein the metal separator includes a wall which is adjacent to the apex portion of the bypass stopping convex portion and which faces an outer end surface of the electrode.

6. The power generation cell according to claim 5, wherein the wall is inclined with respect to a thickness direction of the metal separator.

7. The power generation cell according to claim 5, wherein the metal separator includes a support which is adjacent to the wall and configured to support the resin film.

8. The power generation cell according to claim 7, wherein the wall forms a step between the apex portion of the bypass stopping convex portion and the support.

\* \* \* \* \*